United States Patent
Zhang et al.

(10) Patent No.: US 9,152,482 B2
(45) Date of Patent: Oct. 6, 2015

(54) MULTI-CORE PROCESSOR SYSTEM

(71) Applicant: Huawei Technologies Co., Ltd., Shenzhen (CN)

(72) Inventors: Weiguo Zhang, Shanghai (CN); Libo Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/263,338

(22) Filed: Apr. 28, 2014

(65) Prior Publication Data

US 2014/0229957 A1    Aug. 14, 2014

Related U.S. Application Data

(63) Continuation of application No. PCT/CN2010/070827, filed on Feb. 1, 2012.

(51) Int. Cl.
   *G06F 13/00* (2006.01)
   *G06F 9/54* (2006.01)

(52) U.S. Cl.
   CPC .......... *G06F 9/546* (2013.01); *G06F 2209/548* (2013.01)

(58) Field of Classification Search
   CPC .............................. G06F 9/30145; G06F 9/546
   USPC ..................................... 712/32; 719/313, 314
   See application file for complete search history.

(56) References Cited

U.S. PATENT DOCUMENTS

| 5,745,778 A | 4/1998 | Alfieri |
| 2007/0083735 A1 | 4/2007 | Glew |
| 2008/0244231 A1 * | 10/2008 | Kunze et al. ................ 712/207 |
| 2009/0031317 A1 | 1/2009 | Gopalan et al. |
| 2011/0154346 A1 | 6/2011 | Jula |

(Continued)

FOREIGN PATENT DOCUMENTS

| CN | 1904873 A | 1/2007 |
| CN | 1972239 A | 5/2007 |
| CN | 101014002 A | 8/2007 |

(Continued)

OTHER PUBLICATIONS

Chinese Search Report of Patent Cooperation Treaty (PCT), Application No. PCT/CN2012/070827, dated Nov. 1, 2012, 19 pages.

(Continued)

*Primary Examiner* — Andy Ho
(74) *Attorney, Agent, or Firm* — Slater & Matsil, L.L.P.

(57) ABSTRACT

The present invention provides a multi-core processor system, including: multiple central processor units and multiple groups of level-one hardware message queues. Each central processor unit is separately connected to a group of level-one hardware message queues and is configured to process messages in the level-one hardware message queues. Each group of level-one hardware message queues includes multiple level-one hardware message queues. Moreover, in each group of level-one hardware message queues, a level-one hardware message queue having a higher priority is scheduled preferentially, and level-one hardware message queues having the same priority are scheduled in a round-robin manner according to round robin scheduling weights. Through the multi-core processor system provided in the present invention, the efficiency and performance of the multi-core processor system are improved.

17 Claims, 1 Drawing Sheet

(56) References Cited

U.S. PATENT DOCUMENTS

2012/0005688 A1   1/2012   Kesavan et al.
2013/0061247 A1*  3/2013   Perry et al. .................. 719/314

FOREIGN PATENT DOCUMENTS

| CN | 101217499 A | 7/2008 |
| CN | 101923491 A | 12/2010 |
| WO | 2009014868 A2 | 1/2009 |

OTHER PUBLICATIONS

Chinese Office Action, Application No. 201280000273.5, dated Jun. 18, 2013, 5 pages.
Chinese Search Report, Application No. 2012800002735, dated May 16, 2013, 2 pages.
Sibai, F.N., "Simulation and Performance Analysis of Multi-Core Thread Scheduling and Migration Algorithms," IEEE 2010 International Conference on Complex, Intelligent and Software Intensive Systems, Feb. 15-18, 2010, pp. 895-900.

* cited by examiner

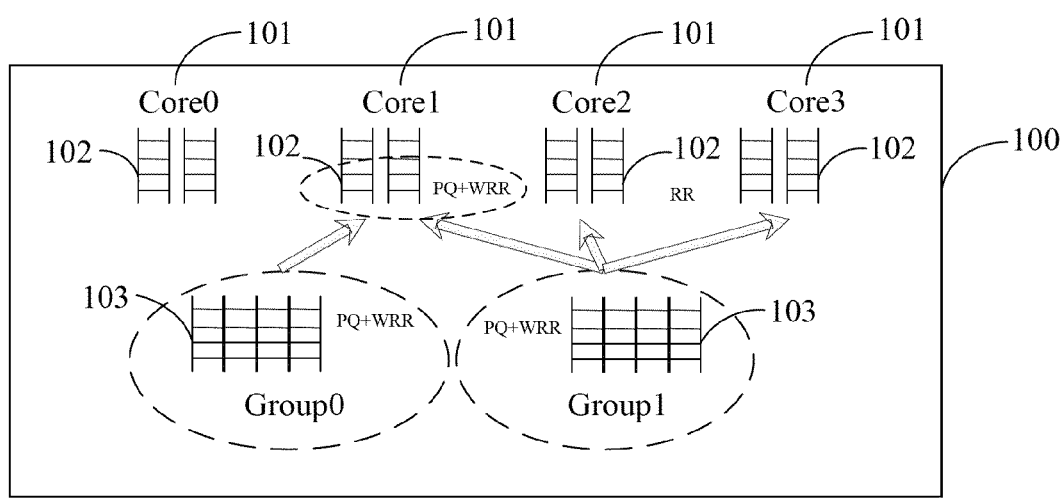

MULTI-CORE PROCESSOR SYSTEM

This application is a continuation of International Application No. PCT/CN2012/070827, filed on Feb. 1, 2012, which is hereby incorporated by reference in its entirety.

TECHNICAL FIELD

The present invention relates to the field of processor technologies, and in particular, to a multi-core processor system.

BACKGROUND

Chip multi processors (CMP) refer to implementing multiple processor units (CPU) in one chip. Each CPU may also be called a core. The cores in the CMP share certain resources among each other and may execute different processes concurrently. Sometimes, procedures executed by the cores of the CMP need to share and synchronize data among each other, so the hardware structure of the CMP must support inter-core communications. Currently, there are two types of mainstream inter-core communication mechanisms. One type is a bus-shared cache structure. The other type is a hardware message queue structure.

The bus-shared cache structure refers to that each core has a shared level-two or level-three cache for storing commonly used data, and consistency of data among the cores is ensured through a bus connecting the cores. Communications among the cores may be implemented through a shared data segment.

The hardware message queue structure refers to implementing a group of queues for each core in a manner of hardware. The operation of queues, as compared with the bus-shared cache structure, improves the efficiency of inter-core communications.

A high efficient inter-core communication mechanism is an important guarantee for high performance of the CMP. However, inter-core hardware message queue structures of the CMP in the prior art cannot satisfy inter-core message exchange and task scheduling with higher performance.

SUMMARY OF THE INVENTION

In view of the above, the present invention provides a multi-core processor system, so as to provide inter-core message exchange and task scheduling with higher performance.

In one aspect, the present invention provides a multi-core processor system, including multiple central processor units and multiple groups of level-one hardware message queues. Each central processor unit is separately connected to a group of level-one hardware message queues and is configured to process messages in the level-one hardware message queues. Each group of level-one hardware message queues includes multiple level-one hardware message queues, and in each group of level-one hardware message queues, a level-one hardware message queue having a higher priority is scheduled preferentially, and level-one hardware message queues having the same priority are scheduled in a round-robin manner according to round robin scheduling weights.

In another aspect, the present invention further provides a multi-core processor system, including multiple central processor units, multiple groups of level-one hardware message queues, and multiple groups of level-two hardware message queues. Each central processor unit is separately connected to a group of level-one hardware message queues and is configured to process messages in the level-one hardware message queues. Each group of level-one hardware message queues includes multiple level-one hardware message queues, and each group of level-two hardware message queues is separately connected to at least one group of level-one hardware message queues and is configured to push messages to the level-one message queues.

As compared with the prior art, through the multi-core processor systems provided in various aspects of the present invention, the inter-core message exchange and task scheduling with higher performance can be satisfied, and the efficiency and performance of the multi-core processor systems are improved.

BRIEF DESCRIPTION OF THE DRAWINGS

FIG. 1 shows a multi-core processor system according to an embodiment of the present invention.

DETAILED DESCRIPTION OF ILLUSTRATIVE EMBODIMENTS

An embodiment of the present invention provides a multi-core processor system. The system includes multiple central processor units and multiple groups of level-one hardware message queues, where each central processor unit is separately connected to a group of level-one hardware message queues and is configured to process messages in the level-one hardware message queues, where each group of level-one hardware message queues includes multiple level-one hardware message queues. In each group of level-one hardware message queues, a level-one hardware message queue having a higher priority is scheduled preferentially, and level-one hardware message queues having the same priority are scheduled in a round-robin manner according to round robin scheduling weights.

Another embodiment of the present invention further provides a multi-core processor system. The system includes multiple central processor units, multiple groups of level-one hardware message queues, and multiple groups of level-two hardware message queues. Each central processor unit is separately connected to a group of level-one hardware message queues and is configured to process messages in the level-one hardware message queues. Each group of level-one hardware message queues includes multiple level-one hardware message queues and each group of level-two hardware message queues is separately connected to at least one group of level-one hardware message queues and is configured to push messages to the level-one message queues.

In the foregoing embodiment, a read speed of the level-one hardware message queues is higher than that of the level-two hardware message queues, and the number of messages supported by the level-one hardware message queues is smaller than the number of messages supported by the level-two hardware message queues.

The following clearly and completely describes the technical solutions according to the embodiments of the present invention with reference to the accompanying drawing in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

This embodiment provides a multi-core processor system 100. As shown in FIG. 1, the multi-core processor system 100 includes: multiple central processor units 101 (Core0, Core1, Core2, and Core3) and multiple groups of level-one hardware message queues 102. Each central processor unit 101 is separately connected to a group of level-one hardware message queues 102 and is configured to process messages in the level-one hardware message queues. Each group of level-one hardware message queues 102 includes multiple level-one hardware message queues.

Furthermore, the multi-core processor system may further include multiple groups of level-two hardware message queues 103. For example, two groups of level-two hardware message queues, Group0 and Group1, are shown in FIG. 1. Each group of level-two hardware message queues 103 is separately connected to at least one group of level-one hardware message queues 102 and is configured to push messages to the level-one message queues.

In this embodiment, the level-one hardware message queues may be high-speed hardware message queues set at locations close to the cores, and a read speed of the high-speed hardware message queues is higher than that of the level-two hardware message queues, while locations of the level-two hardware message queues are relatively far from the cores, but the number of messages supported by the level-two hardware message queues is larger than the number of messages supported by the level-one hardware message queues.

The multi-core processor system 100 provided in this embodiment supports flexible and configurable scheduling and dequeuing policies of message queues.

The following briefly describes several scheduling policies used in the embodiments of the present invention.

Round Robin (RR) scheduling: Query all queues in a round-robin manner, and if a queue has a message, schedule the message to dequeue.

Priority Queue (PQ) scheduling: Such scheduling is a scheduling algorithm based on a priority queue. In the algorithm, scheduling is performed based on priorities of queues. Queues having higher priorities are scheduled first, and queues having lower priorities are scheduled later. If a queue having a higher priority is not empty, the queue having the higher priority is scheduled for dequeuing first. A queue having a lower priority is scheduled only after queues having higher priorities are scheduled to be empty.

Weight Round Robin (WRR) scheduling: The WRR is evolved based on the RR scheduling. Round robin scheduling is performed among queues, and messages in the queues are scheduled according to a weight of each queue.

FIG. 1 shows that the PQ+WRR scheduling policy is configured for a group of level-one hardware message queues 102 connected to the Core1, and the RR scheduling policy is configured for a group of level-one hardware message queues 102 connected to the Core2. The PQ+WRR scheduling policy is described in detail below. The PQ+WRR scheduling policy may include supporting that a highest priority (PQ0) is configured for a queue, where each time a message is scheduled out of a queue, if the queue has a message, the message is scheduled to dequeue. If the queue has no message, other queues are queried.

The PQ+WRR scheduling policy may further include supporting a second highest priority (PQi) that is configured for a queue, where each time a message is scheduled out of a queue, if all queues (PQ0 to PQi−1) having higher priorities than that of the queue have no message and the queue has a message, the message is scheduled to dequeue. If the queue has no message, other queues are queried.

The PQ+WRR scheduling policy may further include supporting different scheduling weights (WRR1 and WRR2) that are configured for multiple queues having the same priority (PQi+1). If all queues (PQ0 to PQi) having higher priorities than that of the queues have no message, messages of the queues are scheduled to dequeue according to the WRR policy.

Persons skilled in the art can understand that the scheduling policy shown in FIG. 1 is merely an example. For each group of level-one hardware message queues 102, other scheduling policies may be configured according to design requirements. For example, the PQ+WRR scheduling policy is configured for all level-one hardware message queues 102.

Furthermore, for each group of level-two hardware queues 103 connected to the level-one hardware message queues, a scheduling policy may also be configured according to design requirements. For example, FIG. 1 shows that the scheduling policy of the two groups of level-two hardware message queues 103 is configured to PQ+WRR, that is described as follows.

If the level-one hardware message queues are empty or a waterline of the message queues is lower than a preset value, traverse all queues in the group in descending order of priorities, and if a certain priority has only one queue and the queue has a message, the message is scheduled and mapped to the level-one hardware queues. If queues with a certain priority have no message, query queues of a next priority. If a certain priority has multiple queues and the multiple queues have messages, schedule the queues having the same priority according to the WRR scheduling policy.

Furthermore, in the embodiment of the present invention, a group of level-two hardware message queues may be mapped to level-one hardware message queues corresponding to multiple cores. For example, FIG. 1 shows that a group of level-two hardware message queues, Group1, may be mapped to level-one hardware message queues corresponding to the Core1, Core2, and Core3. Persons skilled in the art can understand that other mapping solutions can also be configured, and the example of FIG. 1 is not intended to limit the present invention.

In the embodiment of the present invention, a selectable mapping solution of pushing messages in a group of level-two hardware message queues to level-one hardware message queues corresponding to a certain core that are mapped to by the level-two hardware message queue group includes a simple round robin (RR), which cyclically traverse all mapped-to level-one hardware message queues of cores, and if the level-one hardware message queues are empty or lower than a preset waterline value, push messages to the level-one hardware message queues. Alternatively, waterlines of all mapped-to level-one hardware message queues of cores are queried and messages are pushed to a level-one hardware message queue having a minimum number of cached messages. Alternatively, a core for preferential processing is designated and messages are pushed to level-one hardware message queues of other cores only when level-one hardware message queues of the core are full. Alternatively, messages are pushed to level-one hardware message queues of a proper core according to message flow ordering based on tag (TAG) value.

Persons skilled in the art can understand that all function units in each embodiment may be integrated into one processing unit, or each unit may physically exist separately, or two or more units may be integrated into one unit.

The above descriptions are merely exemplary embodiments of the present invention, but not intended to limit the protection scope of the present invention. Any modification, equivalent replacement, or improvement made without departing from the spirit and principle of the present invention shall fall within the protection scope of the present invention.

What is claimed is:

1. A multi-core processor system comprising:
multiple central processor units each of which is separately connected to a group of level-one hardware message queues configured to process messages in the level-one hardware message queues, wherein the group of level-one hardware message queues is further connected to a group of level-two hardware message queues configured to push messages to the level-one hardware message queues.

2. The multi-core processor system according to claim 1, wherein
a read speed of the level-one hardware message queues is higher than that of the level-two hardware message queues, and the number of messages supported by the level-one hardware message queues is smaller than the number of messages supported by the level-two hardware message queues.

3. The multi-core processor system according to claim 1, wherein
in the level-one hardware message queues, a level-one hardware message queue having a higher priority is scheduled preferentially, and level-one hardware message queues having the same priority are scheduled in a round-robin manner according to round robin scheduling weights.

4. The multi-core processor system according to claim 1, wherein
the group of level-two hardware message queues is further connected to a group of other level-one hardware message queues.

5. The multi-core processor system according to claim 4, wherein messages in the level-two hardware message queues are preferentially pushed to a level-one hardware message queue having a minimum number of cached messages between the level-one hardware message queues and the other level-one hardware message queues.

6. The multi-core processor system according to claim 4, wherein the level-one hardware message queues has a different priority as the other level-one hardware message queues, messages in the level-two hardware message queues are preferentially pushed to a group of level-one hardware message queues having a higher priority between the level-one hardware message queues and the other level-one hardware message queues.

7. The multi-core processor system according to claim 4, wherein messages in the level-two hardware message queues are pushed to the level-one hardware message queues and the other level-one hardware message queues, according to message flow ordering based on tag value.

8. The multi-core processor system according to claim 1, wherein
in the level-two hardware message queues, a level-two hardware message queue having a higher priority is scheduled preferentially, and level-two hardware message queues having the same priority are scheduled in a round-robin manner according to round robin scheduling weights.

9. The multi-core processor system according to claim 1, wherein
messages in the level-two hardware message queues are pushed to the level-one hardware message queues when messages in the level-one hardware message queues are empty or lower than a preset waterline value.

10. A multi-core processor system comprising:
multiple central processor units each of which is separately connected to a group of level-one hardware message queues configured to process messages in the level-one hardware message queues, wherein the group of level-one hardware message queues is further connected to a group of level-two hardware message queues configured to push messages to the level-one hardware message queues, and wherein the level-two hardware message queues is further connected to a group of other level-one hardware message queues.

11. The multi-core processor system according to claim 10, wherein
a read speed of the level-one hardware message queues is higher than that of the level-two hardware message queues, and the number of messages supported by the level-one hardware message queues is smaller than the number of messages supported by the level-two hardware message queues.

12. The multi-core processor system according to claim 10, wherein
in the group of level-one hardware message queues, a level-one hardware message queue having a higher priority is scheduled preferentially, and level-one hardware message queues having the same priority are scheduled in a round-robin manner according to round robin scheduling weights.

13. The multi-core processor system according to claim 10, wherein messages in the level-two hardware message queues are preferentially pushed to a level-one hardware message queue having a minimum number of cached messages between the level-one hardware message queues and the other level-one hardware message queues.

14. The multi-core processor system according to claim 10, wherein the level-one hardware message queues has a different priority as the other level-one hardware message queues, messages in the level-two hardware message queues are preferentially pushed to a group of level-one hardware message queues having a higher priority between the level-one hardware message queues and the other level-one hardware message queues.

15. The multi-core processor system according to claim 10, wherein messages in the level-two hardware message queues are pushed to the level-one hardware message queues and the other level-one hardware message queues, according to message flow ordering based on tag value.

16. The multi-core processor system according to claim 10, wherein
in the level-two hardware message queues, a level-two hardware message queue having a higher priority is scheduled preferentially, and level-two hardware message queues having the same priority are scheduled in a round-robin manner according to round robin scheduling weights.

17. The multi-core processor system according to claim 10, wherein
messages in the group of level-two hardware message queues are pushed to the level-one hardware message queues when messages in the level-one hardware message queues are empty or lower than a preset waterline value.

* * * * *

UNITED STATES PATENT AND TRADEMARK OFFICE
CERTIFICATE OF CORRECTION

PATENT NO. : 9,152,482 B2  
APPLICATION NO. : 14/263338  
DATED : October 6, 2015  
INVENTOR(S) : Weiguo Zhang Page 1 of 1

It is certified that error appears in the above-identified patent and that said Letters Patent is hereby corrected as shown below:

On the Title Page, Item (63) Related U.S. Application Data, line 2, delete "PCT/CN2010/070827, filed on Feb. 1, 2012." and insert --PCT/CN2012/070827, filed on Feb. 1, 2012.--

Signed and Sealed this  
Seventh Day of June, 2016

Michelle K. Lee  
*Director of the United States Patent and Trademark Office*